United States Patent Office 3,574,048
Patented Apr. 6, 1971

3,574,048
ADHESIVE FOR SYSTEM COPPER-POLYETHYL-
ENE TEREPHTHALATE LAMINATES
Kenneth W. Klimisch, Northfield, Minn., assignor to
G. T. Schjeldahl Company, Northfield, Minn.
No Drawing. Filed June 7, 1967, Ser. No. 644,057
Int. Cl. B32b 15/08, 15/20; C09j 3/16
U.S. Cl. 161—190                    4 Claims

ABSTRACT OF THE DISCLOSURE

A laminate system including copper and polyethylene terephthalate, preferably bi-axially oriented polyethylene terephthalate, the members forming the laminate being bonded together by a film of an adhesive which consists essentially of a polyester resin modified with polymethylene polyphenylisocyanate. The preferred polyester resin composition is prepared from a linear saturated copolymer composition consisting of the ethyl esters of sebacic and terephthalic acids.

---

The present invention relates generally to an improved adhesive system for copper-polyethylene terephthalate laminates, and in particular a laminate comprising copper and biaxially oriented polyethylene terephthalate. These laminates have particular utility in the printed circuitry area, particularly in the flexible printed circuitry area. In electrical and electronic applications for printed circuits, it is essential that both mechanical and electrical properties of the laminates be considered, and reliability and consistency of results are prime considerations. Films comprising linear polyesters of terephthalic acid and a glycol taken from the series $$HO(CH_2)_nOH$$

where $n$ is an integer from 2–4, inclusive, are commercially available. The preparation of these films is described in U.S. Pat. No. 2,465,319. Oriented, heat-set polyethylene terephthalate film of the type indicated hereinabove are commercially available.

It is, of course, recognized that polyethylene terephthalate, particularly biaxially oriented polyethylene terephthalate has desirable physical and electrical properties. Its physical properties include dimensional stability, and resistance to tear, while its electrical properties include that of being a good dielectric substance.

The adhesive mixture in accordance with the present invention inciludes a linear saturated polyester, preferably prepared from a mixture of about 50:50 (weight) sebacic and terephthalic acids, being esterified with ethylene glycol. To this polyester resin mixture in solution with either methylene chloride or 1,1,2 trichloroethane is added polymethylene polyphenylisocyanate in a percentage ranging from between about 8 percent and 10 percent by weight of resin solids. It will be appreciated that certain departures from the 50:50 (weight) ratios set forth above for the sebacic and terephthalic acids may be made. In this connection, the sebacic acid portion of the reactant mixture may range from between about 40 percent and about 60 percent by weight.

This adhesive mixture finds particular utility in preparing laminates of copper and a biaxially oriented polyethylene terephthalate film, the adhesive being applied to one or both of the surfaces to be laminated, the combination thereafter being passed through the heated nip of conventional laminating systems after being passed through a drying or modifying zone such as a drying tunnel. The finished product, after curing, in addition to its excellent physical and electrical properties, has been found to be highly resistant to changes in relative humidity, as well as to changes in ambient and operating temperatures. Curing cycles are generally in the range of from 2 to 4 days at room temperature, or from about 5 to 10 hours at 150 degrees F.

Therefore, it is an object of the present invention to provide an improved adhesive laminating system for copper and polyethylene terephthalate films, the finished laminate forming a flexible structure with particular utility in flexible printed circuitry applications.

It is a further object of the present invention to provide an improved adhesive for bonding together films of flexible copper, and flexible biaxially oriented polyethylene terephthalate.

Other and further objects of the present invention will become apparent to those skilled in the art from a study of the following specification and appended claims.

In accordance with the preferred modification of the present invention, a laminate is prepared using copper and bi-axially oriented polyethylene terephthalate, the copper preferably being from 1 ounce to 3 ounce copper, the polyethylene terephthalate having a thickness ranging from between about 0.15 up to about 3 mils. It will be appreciated that other thickness of of copper or substrate material may be workable, but for most flexible circuitry applications, the above ranges are most desirable. These materials are preferably bonded together between the heated nip of a roll-to-roll laminator using a heated roll in at least one of the rolls in the nip zone. When one roll is heated, it is preferably in contact with the coated film.

The adhesive for the system, which forms the prominent feature of the present invention, is prepared from a mixture of linear saturated esters of sebacic and terephthalic acids, the dibasic alcohol employed in the reaction mixture preferably being ethylene glycol. These adhesives are, as indicated, commercially available. Various modifying ingredients in the form of relatively low quantities of other acids such as, for example, other aromatic bicarboxylic acids such as isophthalic acid may be employed as well. Linear saturated polyesters of this composition generally have a melting point ranging from between about 140 degrees F. and 340 degrees F., the specific melting point of the preferred 50:50 mixture of sebacic and terephthalic acids esterified with ethylene glycol having a melting point of 270 degrees F. This melting point is, of course, of a desired reactant product. To this adhesive system, between about 8 percent and 10 percent by weight of polymethylene polyphenyl isocyanate is added to the resin solids. If a lesser quantity of this modifier or cross-linking agent is added, very little, if any, beneficial effects occur. If a greater quantity than 10 percent is employed, the laminate becomes highly sensitive to changes in relative humidity, and therefore loses some of its value as for electrical or electronic purposes. If less than about 8 percent is employed, the elongation becomes significantly greater and the tensile strength drops off. In addition, the cure time becomes extensive and the mixture may remain incompletely cured. The solvent employed is preferably a mixture of methylene chloride and 1,1,2 trichloroethane. The combination provides a solvent system which is readily evaporable, but yet is one which retains sufficient tack in the system so as to be readily workable on a hot-roll laminator. The methylene chloride constituent is, of course, the one which evaporates most readily, while the 1,1,2 trichloroethane is the constituent which maintains the adhesive mixture with a desired degree of tack. The adhesive mixture ultimately used will contain sufficient solvent for the viscosity required in the coating technique employed, and preferably this finished material has a solids content ranging from between about 8 percent and 12 percent. It will be further appreciated that for some applications, the solvent system may consist entirely of either methylene chloride or 1,1,2 trichloroethane.

The above identified adhesive system has been found to provide good bonds between copper and bi-axially oriented polyethylene terephthalate film, the film being capable of being laminated at a temperature significantly lower than the melting point of the base resin, thus contributing to a minimum of shrinkage of the substrate present in this system during processing. As indicated previously, the 1,1,2 trichloroethane provides a residual tack in the adhesive after passing through a drying tunnel, and this tack may be advantageously used in the bonding process without risking the formation of blisters.

As indicated previously, the polymethylene polyphenylisocyanate is employed in a range of between about 8 percent and 10 percent by weight of solids in the adhesive. In this range, the tensile strength of the adhesive is improved significantly, and furthermore the elongation is decreased. Polymethylene polyphenylisocyanate is a commercially available compound. It is normally prepared as the reactant product of certain poly diphenylmethane compounds, particularly dimethylene triphenol, which has been nitrated with nitric acid to form the tri-nitro compound. The tri-nitro compound is then reduced to the amine, which is in turn treated with phosgene to give the corresponding isocyanate. A typical analysis of the material is as follows:

| | |
|---|---|
| Isocyanate equivalent (with dibutylamine) | 133.5. |
| Viscosity, centipoises at 25° C. | 250. |
| Hydrolyzable chloride | 0.28%. |
| Specific gravity | 1.2. |
| Flash point | 425° F. |
| NCO content | 31% minimum. |
| Acid valve | up to 200. |
| Molecular weight | 380–400. |

This is a typical polyisocyanate material which cures through active NCO groups.

In order to better illustrate the invention, the following formulation of adhesive was prepared.

EXAMPLE I

| Constituent: | Amount, grams |
|---|---|
| Linear saturated polyester prepared from sebacic acid and terephthalic acid, 50:50 by weight, reacted with excess ethylene glycol, melting point 270 degrees F. (commercially available) in a 15 percent solution of 1,1,2 trichloroethane (resin solids) | 100 |
| Polymethylene polyphenylisocyanate (molecular weight 390) | 8.9 |

The polyester resin solids were placed into solution of 1,1,2 trichloroethane until a mixture of 15 percent solids was obtained. The polymethylene polyphenyl isocyanate is added to the solution and the mixture is then further diluted with methylene chloride until a mixture including 10 percent solids is obtained. This mixture has a pot life of at least 8 hours at room temperature.

EXAMPLE II

The adhesive composition as set forth in Example I was prepared, substituting a linear saturated polyester prepared from sebacic acid and terephthalic acid wherein the sebacic acid comprised 50 percent by weight of the acid in the reactant mixture. The melting point of this polyester was 300 degrees F. Good adhesion was obtained with this mixture.

In each of the aforementioned examples, a laminate comprising 1 mil stress-oriented polyethylene terephthalate film together with 1 ounce copper was prepared. In each case, the adhesive mixture was applied to the surface of the copper, after which the material was passed through a drying tunnel at a temperature of about 100 degrees F. The solvent was evaporated to the extent that a tacky film of adhesive remained on the copper surface. The copper and the polyethylene terephthalate film surfaces were then joined at the nip of a pair of rollers operating in cooperative fashion with their axes parallel, one to another. The roller in contact with the copper was heated to a temperature of about 300 degrees F., and at a web speed of between about 1 to 2 feet per minute excellent adhesion was obtained.

As previously indicated, the finished product finds particular utility in printed circuitry applications. The product is uniformly bonded at the surface juncture, and very little, if any, wicking occurs during the conventional etching operations.

It will be appreciated that these specific examples are given for purposes of illustration only, and that those skilled in the art may depart from these specific examples without actually departing from the spirit and scope of the present invention.

What is claimed is:

1. In a laminate assembly; a film of copper, a film of polyethylene terephthalate and a bonding medium disposed between said copper and said film, the solid content of said bonding medium consisting essentially of a linear saturated copolymer consisting essentially of a mixture of esterified sebacic and terephthalic acids, the acids being included on a 50:50 weight basis, the ester being an aliphatic dibasic alcohol having from between 2 and 4 carbon atoms, said linear saturated polyester including as an addend, a quantity ranging from between about 8 percent and 10 percent of polymethylene polyphenylisocyanate.

2. The method of bonding a film of copper metal to a film of stress-oriented polyethylene terephthalate which comprises applying a film of an adhesive mixture between said surfaces, said adhesive mixture consisting essentially of a solution of a linear saturated copolymer of 50:50 weight parts of sebacic and terephthalatic acids esterified with an aliphatic glycol having from between 2 and 4 carbon atoms, the linear saturated polyester having as an addend, from between 8 percent and 10 percent of polymethylene polyphenylisocyanate, said adhesive mixture being dispersed in a solution of a solvent selected from the group consisting of methylene chloride and 1,1,2-trichloroethane, and thereafter passing said films between a pair of opposed pressure members, at least one of which is heated to a temperature of between about 150 degrees F. and up to a temperature less than about 300 degrees F.

3. The method as set forth in claim 2 being particularly characterized in that said solvent consists essentially of about 50 percent methylene chloride and 50 percent 1,1,2-trichloroethane.

4. The method as set forth in claim 3 being particularly characterized in that the solvent present in said adhesive film is substantially removed prior to the passage of the material between said pressure members.

References Cited

UNITED STATES PATENTS

| | | | |
|---|---|---|---|
| 2,765,250 | 10/1956 | Williams | 161—214 |
| 3,063,958 | 11/1962 | Perkins | 156—331UX |
| 3,072,582 | 1/1963 | Frost | 260—2.5 |
| 3,170,833 | 2/1965 | Noyes | 260—75TNK |
| 3,186,898 | 6/1965 | Melink | 161—214 |

OTHER REFERENCES

Bjorksten, J., et al.: "Polyesters and Their Preparations," copyright 1956, by Reinhold Publishing Corporation, page 230.

JOHN T. GOOLKASIAN, Primary Examiner

L. T. KENDELL, Assistant Examiner

U.S. Cl. X.R.

156— 331, 332; 161—214; 260—75